US008458775B2

(12) United States Patent
Lester et al.

(10) Patent No.: US 8,458,775 B2
(45) Date of Patent: Jun. 4, 2013

(54) MULTIUSER WEB SERVICE SIGN-IN CLIENT SIDE COMPONENTS

(75) Inventors: Erren Dusan Lester, Renton, WA (US); Lynn C Ayres, Bellevue, WA (US); Trevin M Chow, Redmond, WA (US); Kok Wai Chan, Bellevue, WA (US); Rui Chen, Redmond, WA (US); Naresh Jain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1589 days.

(21) Appl. No.: 11/464,087

(22) Filed: Aug. 11, 2006

(65) Prior Publication Data
US 2008/0046983 A1 Feb. 21, 2008

(51) Int. Cl.
*H04L 29/06* (2006.01)
(52) U.S. Cl.
USPC ............... 726/5; 713/152; 713/159; 713/182; 713/185
(58) Field of Classification Search
USPC .......................................................... 726/5
See application file for complete search history.

(56) References Cited

U.S. PATENT DOCUMENTS

| | | | |
|---|---|---|---|
| 5,768,503 A * | 6/1998 | Olkin | 726/5 |
| 6,086,618 A * | 7/2000 | Al-Hilali et al. | 703/2 |
| 6,453,353 B1 | 9/2002 | Win et al. | |
| 6,668,322 B1 | 12/2003 | Wood et al. | |
| 6,725,269 B1 | 4/2004 | Megiddo | |
| 6,944,761 B2 | 9/2005 | Wood et al. | |
| 6,965,918 B1 | 11/2005 | Arnold et al. | |
| 7,016,960 B2 | 3/2006 | Howard et al. | |
| 7,120,785 B1 * | 10/2006 | Bowers et al. | 713/1 |
| 7,254,831 B2 * | 8/2007 | Saunders et al. | 726/8 |
| 2002/0029269 A1 * | 3/2002 | McCarty et al. | 709/225 |
| 2002/0143885 A1 * | 10/2002 | Ross, Jr. | 709/207 |
| 2003/0105981 A1 * | 6/2003 | Miller et al. | 713/202 |
| 2003/0120593 A1 * | 6/2003 | Bansal et al. | 705/39 |
| 2003/0200465 A1 * | 10/2003 | Bhat et al. | 713/202 |
| 2004/0268154 A1 * | 12/2004 | Ullrich | 713/202 |
| 2005/0154913 A1 | 7/2005 | Barriga et al. | |

(Continued)

FOREIGN PATENT DOCUMENTS

| | | |
|---|---|---|
| WO | WO0171961 | 9/2001 |
| WO | WO0172009 | 9/2001 |
| WO | WO0239237 | 5/2002 |

OTHER PUBLICATIONS

Adabala et al., Single sign-on in In-VIGO: role-based access via delegation mechanisms using short-lived user identities, Apr. 2004, Proceedings of the18th International Parallel and Distributed Processing Symposium, pp. 22-30.*

Bruckner, et al., "PASS: A privacy-friendly, secure and open Single Sign-On Protocol for Web Services", Jun. 16, 2003, 15 pages.

(Continued)

*Primary Examiner* — Taghi Arani
*Assistant Examiner* — Kenneth Chang
(74) *Attorney, Agent, or Firm* — Lee & Hayes, PLLC

(57) ABSTRACT

Embodiments of multi-user web service sign-in client side components are presented herein. In an implementation, the currently authenticated user account of a first application of a client is transferred to another application of a client. In another implementation, a common credential store is used to share data for a plurality of user accounts associated with a client between a plurality of applications of the client, and for the applications to output multi-user interfaces having portions corresponding to the plurality of accounts.

20 Claims, 6 Drawing Sheets

U.S. PATENT DOCUMENTS

| | | | |
|---|---|---|---|
| 2006/0031494 A1* | 2/2006 | Marcus et al. | 709/225 |
| 2006/0031683 A1 | 2/2006 | Marion et al. | |
| 2006/0150120 A1* | 7/2006 | Dresti et al. | 715/810 |
| 2006/0174133 A1* | 8/2006 | Obata | 713/182 |
| 2007/0101155 A1* | 5/2007 | Hoghaug et al. | 713/189 |
| 2007/0233540 A1* | 10/2007 | Sirota | 705/8 |

OTHER PUBLICATIONS

Pfitzmann, et al., "Analysis of Liberty Single-Sign-on with Enabled Clients", IEEE Internet Computing, Nov./Dec. 2003, pp. 38-44.

Samar, "Single Sign-On Using Cookies for Web Applications", Oracle Corporation, 6 pages, Jun. 16, 1999.

* cited by examiner

500 

502
Store User Account Data Corresponding to a Plurality of User Accounts Associated with a Client in a Common Credential Store

504
Provide a plurality of Applications of the Client Access to the Common Credential Store such that each Application is able to Obtain the User Account Data from the Common Credential Store, and Utilize the Data to Output a User Interface including Representations for Each of the Plurality of Accounts.

Fig. 5

MULTIUSER WEB SERVICE SIGN-IN CLIENT SIDE COMPONENTS

BACKGROUND

A wide variety of resources (e.g., content and services) are available to users over a network and the number of users accessing the resources is ever increasing. It may beneficial for service providers to provide, and for user to receive, a customized experience, e.g., presenting content and services tailored to particular users. Users presented with custom and/or more relevant desired information may gain a sense of familiarity and an enhanced interaction with network resources and providers. Service providers providing such an experience may accordingly be more popular and therefore receive increased business. However, in public and private settings alike, users often share client devices such as desktop computers, handhelds, set-top boxes, and so forth to gain access to resources. Therefore, a service provider may not know which one of many users is currently accessing provided resources and is unable to tailor the experience.

One traditional technique is to have users register and/or subscribe to individual service providers. Further, some service provider resources may be protected such that a user may need to be authenticated before access is permitted to the resources. In these cases, a user may gain access to resources by proving identity, such as by supplying credentials (e.g., typing a username and password) when prompted. A service provider may then understand which user is accessing the resources. However, using these traditional techniques, each user may need to remember and enter different credentials to access different resources from one or more service provider. In addition, the tailored user experience does not begin until user credentials have been entered and verified. Thus, traditional techniques may not meet service provider and/or user desire for a customized user experience.

SUMMARY

Multiuser web service sign-in client side components are described. In an implementation, an authentication interface is exposed on a client to provide a plurality of client applications access to a common credential store. The common credential store stores a variety of authentication data and user account data corresponding to a plurality of accounts and/or users of the client. The common credential store may be accessed via the authentication interface to effectuate a transfer of an authentication state (e.g., the currently authenticated user) between a first application and a second application executing on the client and/or to obtain and update customized account/profile information, for example user specified graphics or text, for multiple accounts of a client device. Using the obtained customized account information, each of the applications may display user interfaces including portions corresponding to the customized account information for a plurality of accounts, even prior to the act of signing-in to accounts. Thus, different applications may share, via a common credential store, customized interface elements corresponding to multiple accounts and/or users which may be accessed via each application. In this manner, a common user experience (common elements) is produced across a set of multiple client applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 depicts a procedure in an exemplary implementation in which stored user account data corresponding to one or more users and/or accounts is utilized by one or more client applications to output a user interface having customized user portions for one or more of the users and/or accounts.

DETAILED DESCRIPTION

Overview

Figure 1:
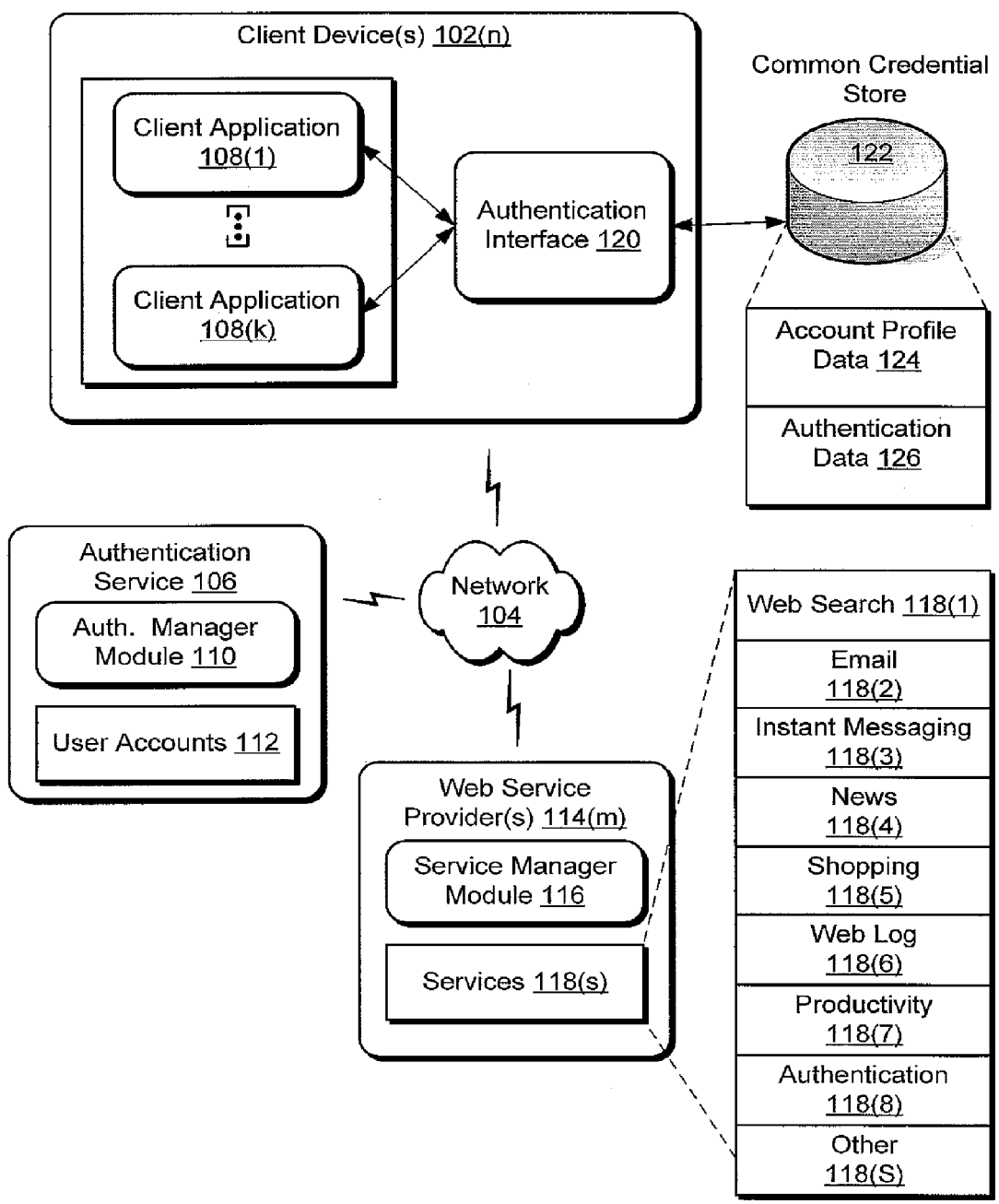
FIG. 1 is an illustration of an environment in an exemplary implementation that is operable to employ multiuser web service sign-in client side component techniques.

A user may use many different client devices such as computers, handheld devices, set-top boxes, and so on to access content via a network. Further, users often share these devices, thus a single device may be associated with many users and/or accounts. It may be beneficial for service providers to provide, and for user to receive, a customized experience, e.g. presenting content and services tailored to particular users. Each user of a client device may desire such customized experiences. However, a service provider may not know which user is using a device to access provided resources and is unable to tailor the experience. Further, traditional techniques may be limited to providing a customized experience to a single user at a time and after the user "signs-in" to an account with a service provider.

Accordingly, multiuser web service sign-in client side component techniques are described in which an authentication interface is exposed to provide a plurality of client applications access to customized user information and authentication data corresponding to a plurality of accounts and/or users of accounts on a client device. In an implementation, an authentication state may be transferred between a first client application and a second client application. For instance, a user may access a web-email account via a browser application on a client device. In an implementation, authentication data associated with the authentication of the user to the email account may be stored in a common credential store accessible to a plurality of client applications. The user may then read an e-mail and wish to communicate with the sender via another communication application, such as an instant messaging application. However, the currently authenticated user account of the instant messaging application may be a different account of the user, or an account of a family member, peer, co-worker of the user, and so forth. The common credential store may be accessed through the browser via an authentication interface of the client, to obtain the authentication data describing the authentication of the user to the corresponding to the email account and browser application. The data may then be utilized to transfer the authenticated user account from the browser to the instant messaging application, such that the account becomes the currently authenticated account for the instant messaging application.

In an implementation, customized user information (e.g. user data) stored in a common credential store may be shared and utilized by a plurality of applications of a client such as to output user interfaces having common user interface elements corresponding to a plurality of users and/or accounts. For instance, a user interface operable to "sign-in" to a web service account, which includes information associated with, and customized by, the users, and which may be displayed before the actual act of sign-in, may be generated based upon the common user information accessed via the common credential store The user interface may have portions corresponding to a plurality of accounts for a service provider, each being associated with a respective user. Additionally, the users may have selected custom information, such as a custom graphic, user tile, font, theme, colors, multimedia, an online status indicator or display message (e.g custom text, icon, and/or graphics) displayable to a group of associated users (e.g., friends), and so forth. The custom information may be shown in the portion corresponding to each of the users, for example displaying a customized user tile with each portion. Thus, the plurality of users may each use the same client device and may see their customized information for a web service account in a user-interface prior to "sign-in" to the user account. The customized information may also allow the users to quickly identify their correct account, e.g. the portion of the interface corresponding to the user's account.

In the following discussion, an exemplary environment is first described that is operable to employ the multiuser web service sign-in client side component techniques described, as well as other techniques. Exemplary procedures are then described which may be employed by the exemplary environment, as well as in other environments.

Exemplary Environment

FIG. 1 is an illustration of an environment 100 in an exemplary implementation that is operable to employ multiuser web service sign-in client side components. The illustrated environment 100 includes a plurality of clients 102(n) (where "n" can be any integer from one to "N") communicatively coupled over a network 104 to an authentication service 106. Clients 102(n) are illustrated as including a plurality of client applications 108(1), [...], 108(k), which may be configured to provide a variety of functionality.

For example, one or more application modules 108(k) may be configured to send and receive email. Email employs standards and conventions for addressing and routing such that the email may be delivered across the network 104 utilizing a plurality of devices, such as routers, other computing devices (e.g., email servers), and so on.

In another example, an application module 108(k) may be configured to send and receive instant messages. Instant messaging provides a mechanism such that a plurality of clients 102(n), when participating in an instant messaging session, may send text messages to each other. A plurality of clients 102(n) may be configured to communicate one to another via network 104. The instant messages are typically communicated in real time, although delayed delivery may also be utilized, such as by logging the text messages when one of the clients 102(n) is unavailable, e.g., offline. Thus, instant messaging may be thought of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

Additional examples of functionality which may be provided by application modules 108(k) include web browsing functionality to access web based services and content; home/office/business productivity functionality such as word processing, database, spreadsheet, and presentation functionality; software development functionality such as development interfaces, tools, management, and compilation; and other computing functionality such as graphic design, media management, editing, viewing, and/or playback. A variety of other examples are also contemplated.

Client applications 108(1)-108(k) may further be configured to interact with the authentication service 106 to gain access to resources (e.g., content and services) provided via network 104. Authentication service 106 is illustrated having an authentication manager module 110 which represents functionality to manage a plurality of user accounts 112, to communicate via network 104, to authenticate clients 102(n) to corresponding user accounts 112, e.g., to determine that clients 102(n) seeking access to resources provided via network 104 "are who they say they are", and so on. Authentication service 106 is depicted as managing a plurality of user accounts 112, which may each correspond to clients 102(n) and/or users of the clients 102(n). User accounts 112 represent data that is utilized for interaction by the clients 102(n) with network resources. For example, an account 112 may correspond to a particular client 102(n) and/or user and may include service authorizations specifying resources with which the account and/or user is permitted to interact, account credentials (e.g., user name and password), user profile data, and so forth.

The plurality of clients 102(n) may be configured in a variety of ways for accessing resources via network 104. For example, one or more of the clients 102(n) may be configured as a computing device, such as a desktop computer, a mobile station, an entertainment appliance, a set-top box communicatively coupled to a display device, a wireless phone, a game console, and so forth. Thus, the client devices 102(n) may range from full resource devices with substantial memory and processor resources (e.g., personal computers, game consoles) to low-resource devices with limited memory, processing and/or display resources (e.g., traditional set-top boxes, hand-held game consoles, wireless phones). In other words, one or more of the client devices 102(n) may describe logical clients that include software and/or devices. Further, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks.

In an implementation, clients 102(n) may be communicatively coupled via network 104 to one or more web service providers 114(m) (where "m" can be any integer from one to "M"). Each of service providers 114(m) is illustrated as having a service manager module 116, which is representative of functionality used by the service providers 114(m) to manage access to one or more services 118(s) over the network 104, performance of the services 118(s), and so on. Although illustrated separately, the functionality represented by the service manager module 116 may be incorporated within the services 118(s) themselves.

In an implementation, the service provider 114(m), via service manager module 116, is configured to redirect clients 102(n) seeking access to services 118(s) to an authentication service 106 for authentication. Thus, rather than authenticate directly with the service provider 114(m), the service provider 114(m) may utilize a separate authentication service 106 for authentication, thereby "offloading" authentication to the authentication service 106. In this way, the service provider 114(m) may be configured to understand whether the clients 102(n) were successfully authenticated by the authentication service 106, but does not need to "understand" how the authentication was performed. Authentication via a service may be limited to a particular service provider 114(m) and/or service 118(s), such that authentication would be valid only for the particular service provider 114(m) and/or service 118(s). Alternatively, a single authentication with an authentication service 106 may permit access to a plurality services 118(s) provided by one or more of the service providers 114(m). In other words, a single verification of credentials (i.e., sign-in) to the authentication service 106, may authenticate the client (i.e., provide proof of identity of the client) for access to a plurality of services 118(s).

One or more of service providers 114(m) may be configured as a provider of a web service suite. A service provider 114(m) configured as a web service suite integrates a plurality of services 118(s) that are accessible via the network 104. Thus, the service provider 114(m) provides a full suite of services rather than individual or only a limited number of services. In an implementation, a user registers (e.g. "signs-up") a single time with the service provider 114(m) and is provided access to all of the services 118(s) of the suite during a session. The user has access to all of the services 118(s) whether the user actually uses the services 118(s) or not, and need not register individually for each different desired service 118(s). A user may simply select one service 118 and then any additional service 118(s) provided by the service provider 114(m) without requiring the client 102(n) to provide additional credentials. In effect, the user turns on the full suite of services 118(s) upon registration with the service provider 114(m). While a service provider 114(m) configured to provide a web service suite has been described, it is contemplated that service providers 114(m) may range from those providing a single one of services 118(s) (e.g., an email provider) up to a provider of a full suite of services 118(s).

The services 118(s) may be configured in a variety of ways to provide functionality over the network 104 to the clients 102(n). For example, the services 118(s) may be configured for access via platform-independent protocols and standards to exchange data over the network 104. The services 118(s), for instance, may be provided via an Internet-hosted module that is accessed via standardized network protocols, such as a simple object access protocol (SOAP) over hypertext transfer protocol (HTTP), extensible markup language (XML), and so on, further discussion of which may be found in relation to FIG. 2.

A wide variety of functionality may be made available via the services 118(s). For example, a plurality of services 118(s) may include a web search service 118(1) (e.g., a search engine) provided to search the Internet, an email service 118(2) provided to send and receive email, and an instant messaging service 118(3) to provide instant messaging between the clients 102(n). Additional examples include a news service 118(4), a shopping (e.g., "ecommerce") service 118(5), service 118(5) service and a web log service 118(6). Further, productivity services 118(7) may also be provided, such as word processing, spreadsheets, presentations, drawings, note-taking, and so on. For instance, network access may be given to one or more of clients 102(n) to applications that were traditionally executed locally on the clients 102(n). Therefore, execution of the application modules may be performed remotely at the service provider 114(m) and results of the execution may be communicated over the network 104 to one or more of the clients 102(n). An authentication service 118(8), integrated as part of a web service provider 114(m) may also be provided to authenticate client 102(n) to access other services, which may include other services provided by one or more of the service providers 114(m). Although a few examples of services 118(s) have been described, it should be apparent that a wide variety of other services 118(S) are also contemplated.

In accordance with multiuser web service sign-in client side components and techniques described herein, client devices 102(n) are illustrated as each having an authentication interface 120. Authentication interface 120 may be exposed on the client to provide functionality accessible by the plurality of client applications 108(k) to perform a variety of authentication related tasks for a client 102(n). For instance, authentication interface 120 may be utilized by a plurality of client applications 108(k) to communicate with authentication service 106 and/or service providers 114(m); to obtain account credentials, profile data, and customized information corresponding to one or more account 112; to access an account 112 and corresponding services 118(s); and so on. Further, through the authentication interface 120, a plurality of client applications 108(k) may interact with a common credential store 122 corresponding to the client 102(n). The common credential store 122 represents functionality to store a variety of account profile data 124 and authentication data 126 corresponding to accounts and/or users of a corresponding one of clients 102(n). Interactions of applications 108(k) may include accessing and updating account profile data 124, obtaining user customized account data for a plurality of accounts, accessing authentication data 126 for multiple accounts and/or users, transferring a valid authentication of a user account between applications and so forth.

The profile data 124 may include a variety of customized account information which may be accessed by the plurality of applications 108(k) via authentication interface 120, such as to output a user interface having user customized portions corresponding to a plurality of accounts. The authentication data 126 may include data describing an authentication state (e.g., the currently authenticated user account) of a first one of applications 108(k) which may be transferred via the authentication interface 120 to a second one of applications 108(k). Further discussion of utilizing multiuser web service sign-in client side components and techniques for multiuser authentication, customized interfaces, and transferring of an authentication state may be found in the discussion of FIGS. 2-6 below.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the multi-user web based sign-in client side component techniques described below are platform-independent, meaning that the techniques may be implemented on a variety of commercial computing platforms having a variety of processors.

Figure 2:
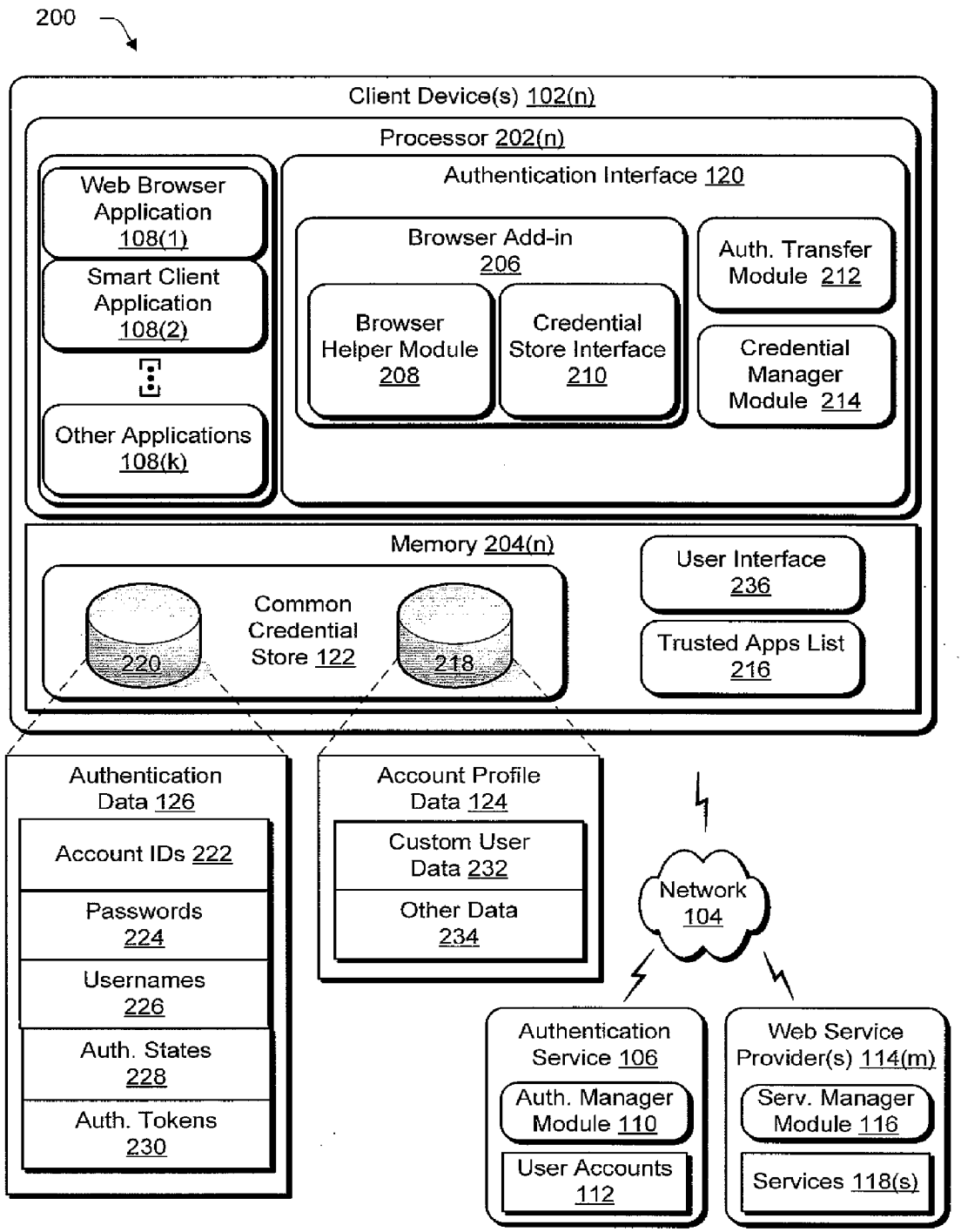
FIG. 2 is an illustration of a system in an exemplary implementation showing a client and services of FIG. 1 in greater detail.

FIG. 2 is an illustration of a system 200 in an exemplary implementation showing a client 102(n) of FIG. 1 implemented as a client device in greater detail. Client device 102(n) may be any of the clients 102(n) depicted in FIG. 1. The client 102(n) is depicted as including a processor 202(n) and a memory 204(n). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204(n) is shown for the client 102(n), a wide variety of types and combinations of memory may be employed, such as random access memory (RAM), hard disk memory, removable medium memory, and other computer-readable media. Authentication service 106 and web service providers 114(m) may also be implemented as computing devices, for instance, each may be implemented via one or more servers configured with respective processors and memories.

Client 102(n) is depicted as executing a plurality of application modules 108(k) and an authentication interface 120 on respective processor 202(n). The application modules 108(k) of FIG. 1 are illustrated as including a browser application 108(1), one or more smart client applications 108(2), as well as other applications 108(k).

Browser application 108(1) may be executed on processor 202(n) of the client 102(n) to allow the client 102(n) to "surf" the Internet, e.g. to interact with resources (e.g., content and services) available via network 104. In another example, the browser application 108(1) may provide interaction with thin client applications accessible via the network 104. Thin client applications (e.g., browser based) may be deployed and executed on a server which then may provide the results of the execution to the browser 108(1) of client 102(n) via network 104. A thin client may provide a variety of network functionality as a part of its operation, such as an instant messaging module, an email module, an online banking module, and so on to the client 102(n) via network 104. A wide variety of other examples are also contemplated.

Smart client applications 108(2) are configured to provide even richer and more powerful functionality than browsers and thin clients applications. Smart client applications 108(2) are deployed and executed on the clients 102(n). For instance, one or more smart clients may be accessed locally from memory 204(n) of client 102(n) and executed on processor 202(n) as depicted. Smart client applications 108(2) may provide users with a rich and responsive user interface, access to network resources, the ability to work offline, as well as providing access to local hardware and software resources and functionality for interaction with other client side applications, interfaces, and components. In addition, they may be designed to run on a broad spectrum of client devices, including desktop PCs, Tablet PCs, handheld mobile devices, Pocket PCs, Smartphones and the like.

Smart client applications 108(2) may also be configured to provide various functionality including but not limited to instant messaging, email, home/office/business productivity such as word processing, database, spreadsheet, and presentation functionality, software development functionality and other computing functionality such as graphic design, and media management, editing, viewing, and/or playback.

Authentication interface 120 in FIG. 2 is illustrated as executing on processor 202(n) and as incorporating a variety of client side components including a browser add-in 206, an authentication transfer module 212, and a credential manager module 214 It is noted that the authentication interface 120 is representative of a variety of functionality that may be provided together as part of a complete authentication interface 120, or via a set of separate and individually provided components. For instance, the browser add-in 206, authentication transfer module 212, and credential manager module 214 may be part of a common interface, as illustrated, or may be provided separately as individual modules. It is contemplated that the functionality described herein as associated with authentication interface 120 may be provided via variety of modules combined in numerous ways.

The browser add-in 206 represents functionality for a browser application 108(1) to interact with the common credential store 122 and for authentication of user accounts via authentication service 106 and/or web service providers 114(m). Interaction with the common credential store 122 may include requesting and receiving account profile data 124 and authentication data 126, managing and/or updating accounts 112 or account information, transferring of an authentication state and so on.

The browser add-in 206 may include sub-components such as a browser helper module 208 and a credential store interface 210 as illustrated in FIG. 2. Browser helper module 208 represents functionality to monitor activity of users during authentication and to monitor changes made to an account 112 while authenticated, such that changes are made to associated data in the common credential store 122. For instance, if a user logs in to an account 112 and chooses to remember an account, delete an account, save a password and so forth, the browser helper module 208 operates to communicate with the common credential store 122 to make corresponding changes to the data associated with the account. These changes are then accessible to any of the plurality of applications which have access to the common credential store 122.

The credential store interface 210 represents functionality callable by a server or web page provided by the server via network 104 for performing interactions through the browser 108(1) with the common credential store 122 and to access the contents of the common credential store 122. For instance, an authentication login page generated by an authentication service 106 may call the credential store interface 210 to cause a variety of actions, such as determining the currently authenticated user account associated with an application, obtaining account profile data 124 for inclusion in a user interface, obtaining various authentication data 126, and so on. Thus, the browser add-in 206 provides one or more mechanisms for a variety of interactions of a browser application 108(1) with a common credential store 122.

Authentication interface 120 further includes an authentication transfer module 212, which is operable to perform a transfer of an authentication state (e.g., currently authenticated user) from one application to another application. For instance, the currently authenticated user account of a browser 108(1) may be made the currently authenticated user account of another application, such as a smart client application 108(2) configured as an office productivity application. Authentication transfer module 212 may operate to automatically obtain authentication data 126 from the credential store 122 describing a current authentication of a user account with a first application (the browser), and to utilize the data to authenticate the user account with respect to the second application (the office productivity application). Further, discussion of authentication transfer via client side components may be found in relation to FIG. 3.

Authentication interface 120 may also include a credential manager module 214 which represents functionality to manage authentication of client applications 108(1)-108(k), to manage the common credential store 122, and to manage access given to the common credential store 122 and so forth. In an implementation, a trusted applications list 216 may be utilized to control which applications 108(k) and/or domains (e.g., servers, network resources, web pages) have access to the common credential store 122 of a client 102(n). For instance, a trusted applications list 216 may be referenced from memory 204(n) via the credential manager module 214 to manage access to the common credential store 122. In this manner, an application or domain attempting access may be checked against the trusted application list 216 to determine if access is permitted. Those trusted applications and domains specified in the list may be given access to the common credential store 122 via authentication interface 120, while unknown or untrusted domains and applications may be prevented from accessing the common credential store 122.

The common credential store 122 in FIG. 2 is illustrated as maintained with memory 204(n) associated with client 102(n). It is noted that common credential store 122 may also be accessible via network 104 from a remote or external location, such as from a server of a service provider 114(m) or authentication service 106. For instance, the common credential store 122 in FIG. 1 is illustrated as being implemented as remote storage, separate from the client 102(n).

The common credential store 122 may be configured to maintain a variety of account profile data 124 and authentication data 126 corresponding to user accounts 112. The account profile data 124 and authentication data 126 may be maintained together in a common storage (as depicted in FIG. 1) or may be implemented via a plurality of separate data storage, databases, and the like such as respective storage 218 and 220 depicted in FIG. 2.

The authentication data 126 includes data for authentication (e.g., credentials) of users and/or accounts associated with the client 102(n). For instance authentication data 126 may include a plurality of account identifiers 222, passwords 224, and usernames 226 each associated with an account 112 which is accessed via the client 102(n). For instance, when authenticating via authentication service 106, a user may choose to save account information (e.g., "remember me") which is then stored for later use in the common credential store 122. A user may then access an account later without having to reenter the authentication data (credentials), e.g. without needing to reenter a password 224 and/or username 226. Further, a user may store authentication data 126 corresponding to numerous accounts 112 (e.g., a work account, a home account, a family account, etc.), and multiple users (e.g., family members, roommates, co-workers) may use the same client device 102(n) to store account data. Thus, common credential store 122 may include authentication data 126 for one or more users and for one or more accounts associated with each user.

In an implementation, authentication data 126 may also include a plurality of authentication states 228 describing authentication of the client applications 108(k) to one or more of the accounts 112. An authentication state 228 describes which user account 112 is currently authenticated to a corresponding one of the plurality of applications 108(k). An authentication state 228 may further include or reference authentication tokens 230, which may be received from an authentication service 106 upon successful authentication to an account 112. Authentication tokens 230 are configured to be used by a client 102(n) as proof of successful authentication. An authentication state 228 may also include or reference additional information such as the credentials (account id 222, password 224, username 226), identification of the application 108(k) corresponding to the described authentication, and so forth. To transfer an authenticated account between applications, an authentication state 228 and/or authentication tokens 230 from the common credential store may be exported from a first application to a second application via authentication interface 120 or components of the interface, and more specifically via the authentication transfer module 212. Alternatively, authentication transfer module 212 may be configured to utilize data from the common credential store 122 (authentication state 228 and/or authentication tokens 230) to cause authentication of the associated user account with respect to the second application without providing the data to the second application. Further, discussion of transferring an authenticated account between applications may be found in relation to FIG. 3.

Account profile data 124 is depicted as including a variety of custom user data 232. The custom user account data 232 may include user preferences, account descriptions, customized user interface elements such as a user tiles, color schemes, start-up locations, sounds, video, animation, themes, toggles for stored data, and so forth. As noted, account profile data 124 may be implemented in the same or different storage as authentication data 126. A variety of other data 234 may also be maintained in a common credential store 122, such as data describing which applications or accounts have been used, the frequency of use, and identification of where profile or authentication data originated (e.g. which application or domain). While other data 234 is depicted as associated with account profile data 124, other data 234 may also be included as part of the authentication data 126.

Data obtained from the common credential store 122 for a plurality of accounts 112 may be incorporated into one or more user interfaces output by one or more of the applications 108(k). For instance, a representative user interface 236 which may be exposed on a client 102(n) is depicted in FIG. 2 as stored in memory 204(n). A user interface 236 may incorporate customized user data 232 corresponding to a plurality of accounts, which is retrieved from the common credential store 122. A variety of user interfaces 236 output by numerous different applications 108(k) of a client 102(n) may include a plurality of common elements (for example, user tiles or other customized data) thereby providing a common user experience across the different applications 108(k). Further discussion of accessing customized user account data 232 to output a customized and/or multi-user interface may be found in relation to FIGS. 5-6.

Exemplary Procedures

The following discussion describes multiuser web service sign-in client side component techniques that may be implemented utilizing the previously described systems, interfaces, and devices. Reference will be made in the course of the discussion of the following procedures to the environment depicted in FIG. 1 and the system depicted in FIG. 2. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 3:
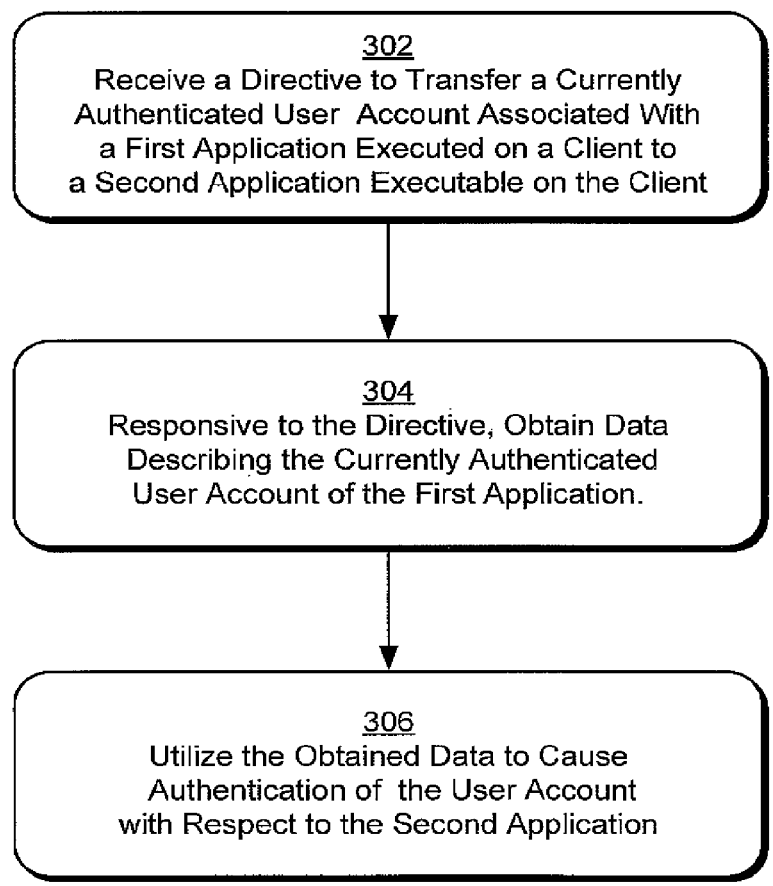
FIG. 3 depicts a procedure in an exemplary implementation in which an authentication state is transferred from a first application to a second application.

FIG. 3 depicts a procedure 300 in an exemplary implementation in which the authentication of a user account is transferred from one application to another on a client. A directive is received to transfer a currently authenticated user account associated with a first application executed on a client to a second application executable on the client (block 302). For instance, authentication interface 120 may receive and respond to directives communicated via a plurality of applications 108(k) of the client 102(n). Directives may be configured as commands or communications according to a variety of protocols, such as Active X functions, controls, and calls; simple object access protocol (SOAP) messages; hypertext transfer protocol (HTTP), extensible markup language (XML); and/or other suitable protocols and commands for communicating between applications 108(k) and components of the authentication interface 120 exposed on a client 102(n). In an implementation, the directive may also provide information identifying a second application to which the account should be transferred, such as a process id, executable name, or other suitable identifier. Such directives and commands may accordingly be used to initiate the transfer of a currently authenticated user account between applications 108(k).

Responsive to the directive, data is obtained describing the currently authenticated user account of the first application (block 304). For instance, smart client application 108(2) may be configured to direct the authentication interface 120 to obtain data describing a currently authenticated user account and to cause a transfer of the authenticated user account to another one of applications 108(1)-108(k), which may be another smart client application 108(2), a browser 108(1) and so forth. Client side components associated with the authentication interface 120 are configured to process and respond to directives from a variety of sources. In an implementation, the authentication interface 120 may incorporate an authentication transfer module 212 configured to perform the requested transfer of the authenticated user account. The directive may also be generated from a service, for instance from the authentication manager module 110 of authentication service 106, and communicated via an application 108(k) to the authentication interface 120 to be carried out.

In addition, a browser application 108(1) may also provide a mechanism for directing the transfer of the currently authenticated user account to another application 108(k), such as a smart client application 108(2) or other client application. For instance, a user interface rendered by the browser 108(1) may be configured to communicate directives to the authentication interface 120. In an implementation a browser add-in 206 is configured to expose functionality to network services (e.g., authentication service 106 and/or service providers 114(m)) to interact with the authentication interface 120. Such interactions may include communicating various directives to the authentication interface 120, which may further include a directive to transfer an authentication state or authentication data describing the currently authenticated user account between applications 108(k) of a client 102(n).

Upon communication of a directive by one of client applications 108(k), the authentication interface 120 (or components of the interface such as the authentication transfer module 212) receives the directive and in response obtains data describing the currently authenticated user account of the client application (e.g., the first application). The data may be obtained locally in storage on the client 102(n), or may be accessible via the network 104 such as from storage at an authentication service 106, service provider 114(m), or otherwise remotely accessible storage.

The data obtained may then be utilized to cause authentication of the user account with respect to the second application (block 306). For instance, the data may be provided to the second application, which may then use the data to authenticate to the same user account. The authentication interface 120 may for example extract certain types of data such as a user name, account id, password, authentication token and so forth, which is passed to the second application to transfer the authenticated user account to the second application. Alternatively, authentication interface may be configured to pass the data or portions thereof via the network 104, such as to a service provider 114(m) or authentication service 106, to cause to the authentication of the user account with respect to the second application. For instance, the obtained data along with identification of the second application (such as an identifier provided with the directive) may be passed by the authentication interface 120 directly to the authentication service 106, which may perform authentication of the user account with respect to the second application based on the provided data. Upon successful authentication, data describing the authentication of the second application (such as an authentication token 230, or the like) may be provided to the client for proof of authentication with respect to the second application. The second application may then be utilized by the client to access services 118(s) corresponding to the user account.

Figure 4:
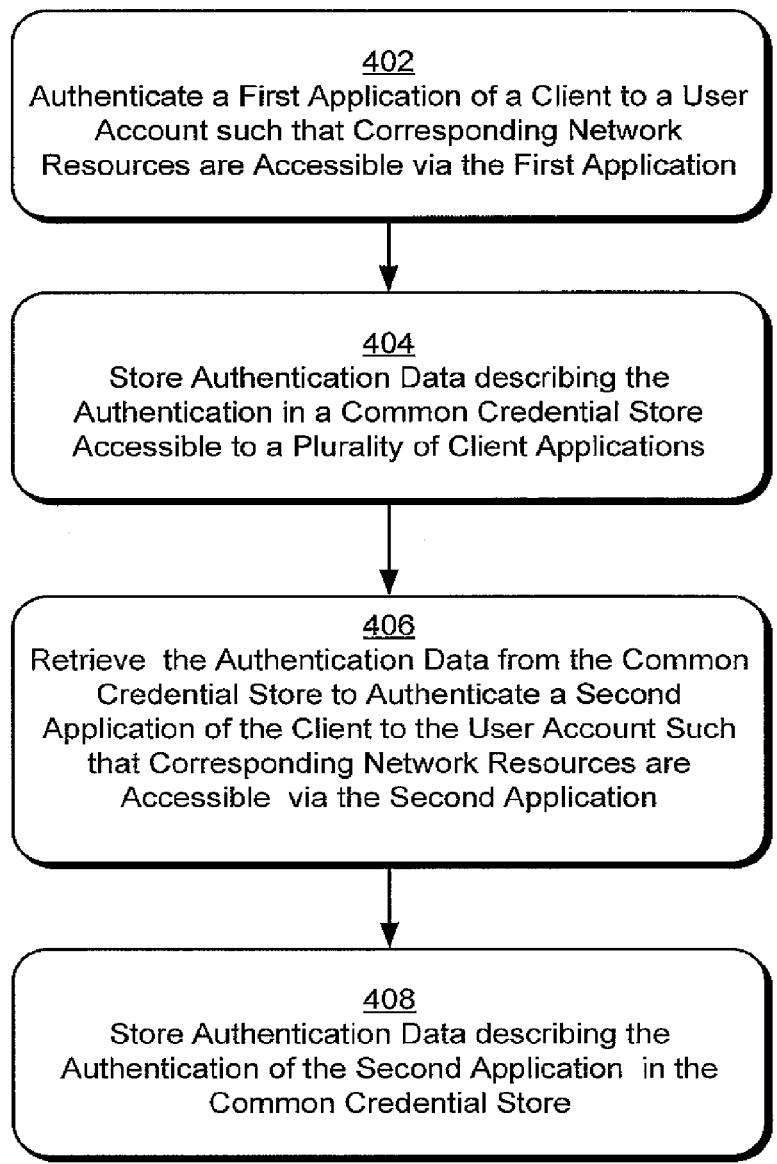
FIG. 4 depicts a procedure in an exemplary implementation in which data describing the currently authenticated user account associated with one or more applications of a client is stored in a common credential store and utilized to transfer an authentication state between applications.

FIG. 4 depicts a procedure 400 in an exemplary implementation in which data describing authentication of an application is stored in a common credential store accessible to a plurality of client applications and utilized to transfer an authentication state between applications. For example, a first application of a client is authenticated, such that corresponding network resources are accessible via the application (block 402). Assume a user "Adam" is using a first application on a client 102(n). It should be appreciated that this is but one of numerous contemplated examples in which an authenticated user account may be transferred among applications of a client. For the purposes of this example assume "Adam" is using a web browser 108(1) to access web based email. "Adam" may have numerous accounts such as "Adam@work", "Adam@play". Further associates of Adam's such as friends and family may also have accounts which might be used on the same client 102(n). Thus, at a given time different applications 108(k) of a client 102(n) may be associated with, or authenticated to a variety of different accounts of one or more associated users.

"Adam" may provide credentials corresponding to the account "Adam@work" to authenticate a corresponding account 112 with a service provider 114(m) which provides email service 118(2). The authentication may occur directly with a service provider 114(m), via an authentication service 106, or by other suitable authentication sequences. In an implementation, the authentication interface 120 or components thereof may operate to perform the authentication, such as communicating with an authentication service 106, obtaining stored credentials and so forth. In response to successful authentication, the client 102(n) may receive authentication data (such as a ticket, token, credentials or other suitable proof of authentication and identity) which may be utilized by the client 102(n) and in particular the first application to access corresponding resources (e.g., email).

The authentication data describing the authentication of the application is stored in a common credential store accessible to a plurality of client applications (block 404). In the previous example, the authentication of the account "Adam@work" may be stored in a common credential store 122. The common credential store 122 may be configured as previously described to store a variety of authentication data 126 and account profile data 124 corresponding to a plurality of users and/or user accounts. Further, the common credential store 122 may be maintained and accessed locally on a client, such as from memory 204(n) of client 102(n) in FIG. 2, or may be remotely accessible via the network 104. A plurality of applications 108(k) associated with a client 102(n) may be configured to utilize the authentication interface 120 to access the data stored in the common credential store 122 for authentication of user accounts 112, to transfer an authenticated user account, to obtain user profile data, and so forth. In this manner, the data in the common credential store may be shared among a plurality of applications of a client to provide a common user experience across numerous different applications, e.g. a common look and feel. The components of the authentication interface 120 may further provide functionality to interact with a common credential store 122, such as to update, add, delete and otherwise manage data from the common credential store 122.

Functionality described as part of the authentication interface 120 may be implemented as different components for interactions with different types of clients. For instance, a browser 108(1) having relatively basic functionality may utilize a browser add-in 206 which exposes mechanisms for interactions via the authentication interface 120 with the authentication transfer module 212, credential manager module 214, common credential store 122 and so forth. In this manner, web pages, services, servers and so forth may interact with the common credential store 122 via the browser 108(1). Richer clients providing relatively greater functionality, such as smart client applications 108(2) may be configured to directly interact with the authentication interface 120, authentication transfer module 212, credential manager module 214 and so on. Thus, authentication interface 120 may represent functionality of a common interface through which many different types of applications 108(k) may each interact with the common credential store 122 and may be implemented as various separate client side components configured to provide functionality and interaction for different applications.

After the authentication data corresponding to a first application is stored, the authentication data may be retrieved from the common credential store to authenticate a second application to the user account such that corresponding network resources are accessible via the second application (block 406). The authentication interface 120 provides a mechanism for a plurality of client applications to access and use the data stored in the common credential store 122. Assume now that the account "Adam@work" of the previous example is also usable with a second application, such as a smart client application 108(2) configured for instant messaging. If "Adam" accesses and receives an e-mail from a co-worker via the browser application, "Adam" may wish to immediately speak to the co-worker in an instant messaging session rather than respond via email. Further, "Adam" may wish to use the same account "Adam@work" for the instant messaging application. However, the instant messaging application may not be logged into the same account "Adam@work" as the browser application. For instance, the instant messaging application may not be executed, or may be logged into a different account of the same user such as "Adam@play" or the account of another user such as a family member, co-worker and so on.

In one or more implementations, authentication interface 120 is configured to receive instructions or directives to transfer the currently authenticated user account from a first application to a second application, such as the directives previously described with respect to FIG. 3. In response, to the instructions, authentication interface 120 and/or the components of the authentication interface 120 may operate to cause the transfer, in the present example transferring the authenticated user account "Adam@work" from the browser to the instant messaging application. The authentication interface 120, in response to the instructions, retrieves authentication data 126 describing the currently authenticated user account "Adam@work" associated with the browser 108(1) from the common credential store 122. The retrieved authentication data 126 may then be used to authenticate the account "Adam@work" with respect to the instant messaging application. This authentication may be performed directly by the authentication interface 120, through an authentication service 106 or service provider 114(m), by providing the retrieved data to the second application which then may perform the authentication, and so forth. In an implementation, the user need not re-enter credential information to move between the applications using the same account. Thus, the user may seamlessly move from one application to another using the same account 112, automatically and without additional input of credentials. It is noted that each application could be configured to handle "sign-in" differently. For instance, one application could prompt a user for credentials, another may perform "sign-in" automatically, yet another may ask for a password but not username, and so forth. The particular mode of "sign-in" corresponding to each application may be configurable by a user, by an administrator, set by default, and so forth.

In an implementation, a user via a user interface associated with a first application may make a selection which initiates the transfer of the authenticated user account to the second application. For instance, a selectable control or link may be exposed via a user interface of the first application which, when selected, effectuates the transfer of the authentication state via the authentication interface 120. In the continuing example, "Adam" via the browser application may select a portion within the web based email interface, such as a selectable text, icon, control, button, or the like. In this example, the portion may indicate that the sender of the email (Adam's coworker) is currently online (e.g., logged on to an account) and provide selectable access to the instant messaging application. Selecting the portion in this case will initiate the transfer of the authenticated user account "Adam@work" to the second application, e.g. the instant messaging application. Thus, when "Adam" selects the portion, instructions may be communicated to the authentication interface 120 to cause the transfer of the authentication state (e.g. "Adam@work") from the browser 108(1) to the instant messaging application.

Alternatively, one or more portions of the interface within a first application could specify a variety of other applications which the user may wish to use, such as buttons or controls with "IM this Sender?" for instant messaging, "Collaborate Online" for a productivity application, "Share or Edit Photos?" for multimedia, and so on. These selectable portions may be selectively displayed in the user interface of one of the client applications 108(k) based on the context of the browser application 108(1) used for email in this present example, or for other client applications 108(k), based on the content and/or context in the particular situation. For instance, when an email, instant message or so on is from a known instant messaging contact, a selectable "IM this Sender?" portion may be displayed. When an email or other content used by an application includes multimedia content (photos, music, video etc.), a "share" or "edit" portion corresponding to a multimedia application may be displayed. A variety of other examples are also contemplated.

The authentication interface 120 may further be configured to determine when to undertake the authentication of the user account with respect to the second application. In certain instances, a selected or indicated second application to which a user account is to be transferred may be already executed, such as in the background on a client device or in a minimized state. The authentication interface 120 detects this and accordingly may determine the currently authenticated user accounts associated with each of the applications and compare them. When the accounts match (e.g., both are "Adam@work") then control may be switched between the applications without transfer of authentication data, authentication via network 104, and so on. On the other hand, when it is determined that the authenticated user accounts associated with the applications differ (for example "Adam@work" and "Adam@play" for the browser and instant messaging applications respectively, or no authenticated account associated with the instant messaging application) then operations to transfer the user account between the applications are performed. Additionally, the transferring may include causing the selected second application to become active, e.g. switching to the application. When the second application indicated to receive the user account is not currently active or executed, the authentication interface 120 may also determine this and cause the application to be executed, as well as initiating the transfer of the currently authenticated user account from the first application to the second.

It is noted that certain applications 108(k) may be executed in numerous e instances. Thus, a particular client application could be authenticated to multiple user accounts at the same time. Accordingly, the authentication interface 120 may be configured to initiate an instance of a particular application with respect to one user account (e.g., in the course of transferring the authenticated user account from another application) while a second user account is concurrently authenticated in another instance of the particular application, and without signing the second user account out. Each application may be individually configured to determine if and how many instances are permitted.

For example, "Adam" may be "signed-in" to "Adam@play" in email via browser 108(1) and to "Adam@work" via an instance of an instant messaging application 108(k). "Adam" may select a link in email to launch an instant messaging session with a friend, which causes authentication interface 120 to transfer the account "Adam@play" to an instance of the instant messaging application 108(k). If the instant messaging application 108(k) is configured for multiple instances, then "Adam@play" may be transferred without "Adam@work" being "signed-out". Alternatively, authentication interface 120 may be configured to "sign-out" the currently authenticated user account of an application (such as instant messaging 108(k)) to perform the transfer, if the allowed instances are limited by a user, an application, a configuration setting, the processing capability of a device, and so forth. Thus, authentication transfer to a particular application may or may not involve "signing-out" of a currently authenticated user account of the particular application.

Authentication data describing the authentication of the second application is stored in the common credential store (block. 408). Upon successful authentication of "Adam@work" to the instant messaging application, the client 102(n) may receive authentication data 126 such as a ticket or token from an authentication service 106, or other suitable proof of authentication and identity. The data corresponding to the authentication of "Adam@work" to the instant messaging application may then be stored in the common credential store 122, and may be later accessed via the authentication interface 120, such as to access corresponding resources via the instant messaging application, transfer the account "Adam@work" to another application 108(k) and so forth.

FIG. 5 depicts a procedure 500 in an exemplary implementation in which stored user account data corresponding to one or more users and/or accounts is utilized by a plurality of client applications to output a multiuser interface.

User account data corresponding to a plurality of user accounts associated with a client is stored in a common credential store (block 502). For instance, common credential store 122 depicted in memory 204(n) of client 102(n) in FIG. 2 may store information identifying a plurality of user accounts 112, users of the accounts, and/or authentication data 126, account profile data 124 associated with the accounts 112, and so forth. Data may be stored locally on a client 102(n) or remotely (e.g., accessible to the client 102(n) in remote storage via network 104).

Data maintained in the common credential store 122 may also include a variety of custom user data 232 corresponding to a plurality of users and/or accounts. For instance, a user may specify a unique user tile (e.g., icon, avatar, graphic representation) to be associated with the user or an account, when initially registering for an account or subsequently when accessing an account profile. Users may also specify additional kinds of custom user data 232 such as account names, user tiles, colors, schemes, audio, video, color themes, icons, pictures, text, animations, and so on. Thus, applications 108(k) interacting with the credential store 122 via authentication interface 120 may obtain the customized information corresponding to one or more users and/or accounts.

Access to the common credential store is provided to a plurality of applications of the client. Each application may then obtain user account data from the common credential store, and utilize the data to output a user interface including representations for each of the plurality of accounts (block 504).

For instance, client side components which may be incorporated with an authentication interface 120 as previously described, are configured to provide a plurality of client applications 108(k) access to, and interactions with, the common credential store 122. As described previously, such interactions may include directives to transfer an authentication state. Additionally the authentication interface exposes functionality operable via a plurality of client applications to add, delete, update, manage, and so forth, data maintained in a common credential store 122. Still further, the components may permit applications to access user account data, customized account data, profile data and the like corresponding to a plurality of accounts. Such user account data may be incorporated in a user interface 236 having customized portions or elements corresponding to one or more users and/or accounts. Further, account data may be displayed in an interface exposed on the client 102(n) for multiple accounts and/or users, prior to authentication or "sign-in" to those accounts.

For instance, the browser add-in 206 depicted in FIG. 2 may expose functionality accessible to web service providers 114(m), authentication service 106 and other network resources to interact with the common credential store 122. Thus, when a user via the browser 108(1) initiates an account 112 with a service provider 114(m), accesses an account 112, or changes account data, and so forth, browser add-in 206 provides mechanisms to store and update the information in the common credential store 122. Browser add-in 206 may include sub-components such as the browser helper module 208 and credential store interface 210 to provide a variety of functionality for interactions with the common credential store 122 as previously described.

In an implementation, the browser add-in 206 provides an indirect mechanism for accessing the credential database such as by exposing functionality to communicate via a browser 108(1) with authentication interface 120 or modules such as the authentication transfer module 212 or credential manager module 214. For example, a webpage such as an authentication page provided by authentication 106 may be configured to call the credential store interface 210, to perform actions such as adding or deleting accounts, returning the current authenticated user account, deleting all saved accounts, saving user customized data or profile data such as user tiles and preferences, and so forth. These actions, when performed, may be routed from the calling entity (service, server, web page) through credential store interface 210, which in turn causes the credential manager module 214 or other authentication interface 120 components to perform the desired operations.

Other applications such as smart client applications 108(2) may interact more directly with the authentication interface 120 via calls made from the applications directly to the authentication transfer module 212 and/or credential manger module 214. Thus, a plurality of different client applications 108(k) may each store, access, and maintain authentication data 126 and account profile data 124 for a plurality of users and/or accounts associated with a client 102(n).

Changes made in the common credential store 122 via one client application 108(k) are accessible to the plurality of other client applications 108(k) via the authentication interface 120 and/or components of the authentication interface 120. Customized information obtained from the common credential store 122 may then be included in a user interface, such as user interface 236 depicted in FIG. 2 having customized elements in portions corresponding to a plurality of applications, an exemplary implementation of which is described in the following discussion of FIG. 6.

Figure 6:
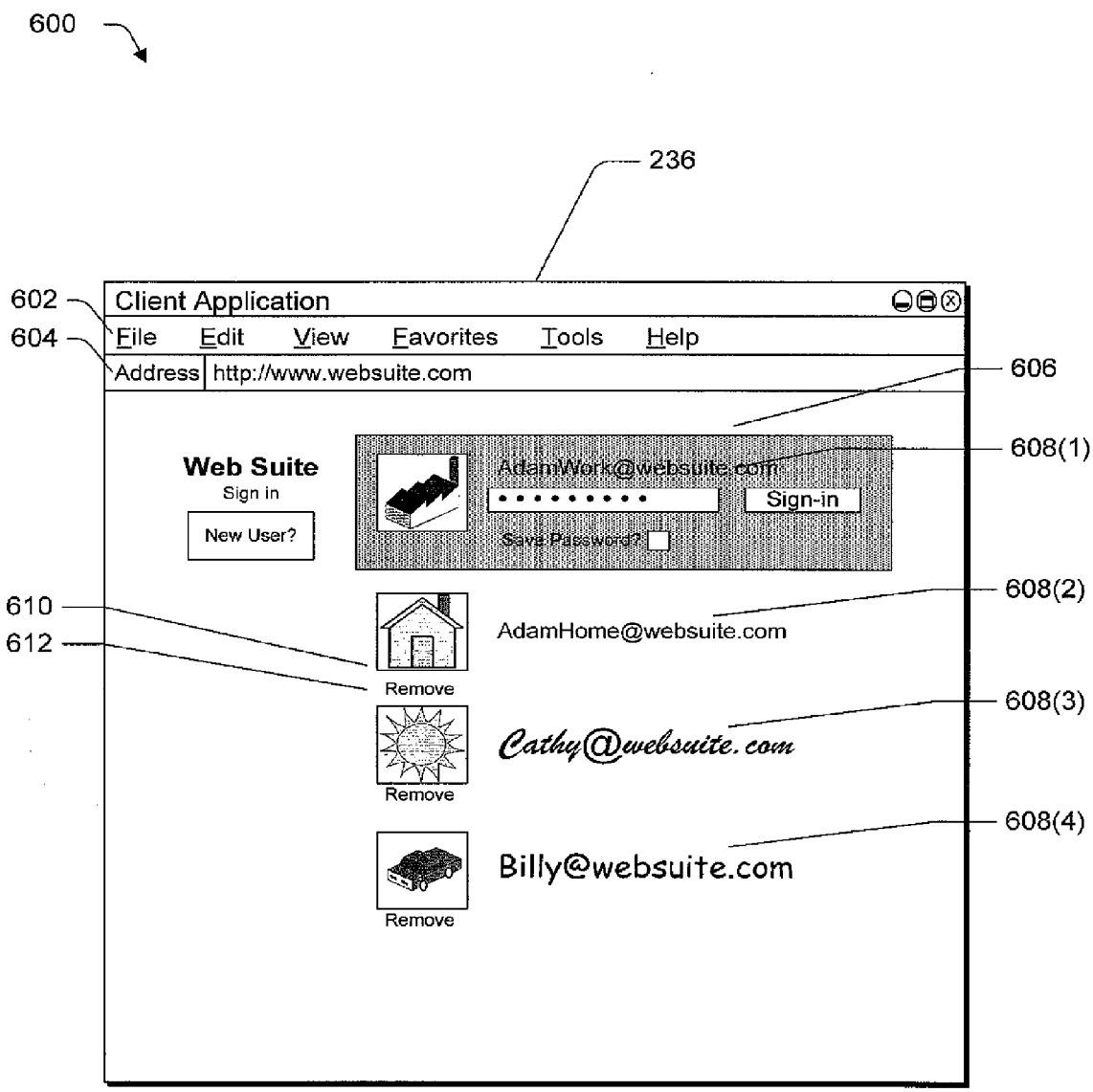
FIG. 6 depicts an exemplary multiuser interface which may be output using shared user account data obtained from a common credential store associated with a client.

FIG. 6 depicts an exemplary implementation 600 of a user interface 236 that may be generated having customized portions corresponding to one or more of a plurality of users and/or accounts associated with a client 102(n). The user interface 236 may correspond to any one of applications 108(k) of FIG. 1 or FIG. 2. Numerous other user interfaces 236 incorporating data from the common credential store 122 are contemplated. For example, a user tile associated with an account 112 may be utilized in each application 108(k) associated with the account 112. One or more user interfaces 236 may be arranged to display customized account information or elements for one or more account in a variety of ways. Thus, customized account elements such as a user tile may be shared across a set of applications to provide a common user experience.

In the implementation 600 of FIG. 6, user interface 236 is depicted as a "sign-in" page for a web service provider 114 (m) having customized portions corresponding to a plurality of user accounts 112. Individual portions of user interface 236 may be selectable to cause authentication to a corresponding account 112. It is further noted that a plurality of client applications including smart client applications 108(2) and browsers 108(1) may generate the same or similar interfaces. Thus, a common look and feel is populated across numerous client applications enhancing the user's experience. Common elements corresponding to a plurality of user accounts may be included in the user interfaces 236, even for user accounts 112 which have not been signed in to.

The user interface 236 may include a menu bar 602. An address bar 604 shows a browser directed to a service provider 114(m), specifically "websuite.com" "websuite.com" may be configured to provide a suite of services as previously discussed with respect to FIG. 1. A plurality of portions 608(1)-608(4) is depicted, each corresponding to a one of a plurality of accounts and/or users (e.g., AdamWork, AdamHome, Cathy, Billy). In this case, the user interface 236 may represent portions for members of a family which use the same home computer (client 102(n)) to access network resources. Similar arrangements of a user interface 236 in other settings such as work or school are contemplated.

User interface 236 may have a highlight region 606 which indicates the currently active or selected portion, in this case portion 608(1) corresponding to user Adam and an account "AdamWork@websuite.com". A portion 608, when in the highlight region may be expanded to include additional custom user data 232. For instance, portion 608(1) is depicted having a password input box for a user to enter a password associated with AdamWork@websuite.com, a sign-in button, and an option to save the password. Adam, for example may have previously elected not to have his password remembered.

A variety of expanded options are contemplated. In an instance, a user may elect to save password, username and/or other credentials (e.g. authentication data 126) such that authentication is initiated without needing to reenter this information, e.g., authentication occurs upon selection of the portion 608 corresponding to the account 112 without the user entering any user credentials.

Each portion 608 may further include an associated image or user tile 610. The associated image or user tile 610 is an example of the custom user data 232 previously described. The user tile 610 is selectable for instance at the time a user initially registers for an account 112 and/or services 118(s) with a service provider 114(m). Each portion 608 may have a different respective tile 610 corresponding to a particular user account 112, for example the factory, house, sun and car associated respectively with AdamWork, AdamHome, Cathy and Billy in FIG. 6. Naturally, tiles 610 may be omitted or a default tile may be provided in the absence of a user selection.

Portions 608 may be configured to include a variety of other custom user data 232 such as customized text, fonts, animation, video, audio and so forth. As an example, portions 608(3) and 608(4) are illustrated as having user customized font types for the displayed text. In addition, the user tiles 610 may incorporate animation, video, and/or audio. Selecting or highlighting a particular portion 608, for example, may cause playback of a user specific video clip, animation, audio clip and so on included with the user tile 610 or otherwise associated with the portion 608. A variety of other examples are also contemplated.

Again, the user tile 610 or other custom user data 232 such as text, sound, and graphics may be stored locally, or remotely such as in a common credential store 122, and may be retrieved via an authentication interface 120 to be included in the user interface 236 as previously described. Each portion 608 may optionally include a remove option 612, which when selected causes the corresponding account 112 to be removed from the display in a user interface 236 As noted these updates may be detected by the browser add-in 206 or a smart client and reflected in the common credential store 122.

Thus, common user interface elements specified by data in the common credential store may be used across various applications 108(k). The user specified preferences for tiles, text, colors and so forth may be displayed "everywhere a user goes". In other words, when interacting with a service provider 114(m) configured to provide a suite of services 118(s), the customized elements may be displayed in each of the associated client applications 108(k) whether they are smart clients, thin clients, browsers, full resource stand-alone applications, or other applications. Thus, the user has a consistent and familiar user-experience throughout an entire suite of services 118(s), and with a plurality of applications 108(k). These elements may further be displayed prior to the user "signing-in" to an account, as well as for multiple users and/or accounts at the same time.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method, comprising:
    receiving a directive to transfer a currently authenticated user account associated with a first application executed on a client to a second application executable on the client;
    responsive to the directive:
        obtaining from a common credential store, authentication data describing the currently authenticated user account associated with the first application
        detecting whether the second application has been executed at the time of receiving the directive;
        comparing the currently authenticated user account associated with the first application and a user account associated with the second application;
        switching control between the first application and the second application without transfer of the authentication data when the user accounts associated with the first application and the second application match;
        transferring the currently authenticated user account associated with the first application to the second application when the user accounts associated with the first application and the second application differ; and
        in response to the transferring, replacing the user account associated with the second application with the currently authenticated user account associated with the first application; and
        exposing on the client an authentication interface callable via a plurality of applications of the client to perform the transfer of the currently authenticated user account, wherein the authentication interface performs the receiving of and responding to the directive and communicates with an authentication service via a network for each of a plurality of applications of the client to cause authentication of user accounts with respect to the plurality of applications.

2. The method as recited in claim 1, wherein the authentication interface is configured to:
    responsive to the communication, receive authentication data indicative of successful authentication of a particular user account with respect to each respective application; and
    responsive to a directive from a respective application, export corresponding authentication data describing the currently authenticated user account to another application.

3. The method as recited in claim 1, wherein:
    the first application is configured as a web browser; and
    the authentication interface includes a browser add-in configured to allow web pages accessed via the web browser to communicate directives such that the directives are performed by the authentication interface.

4. The method as recited in claim 1, wherein the authentication data is obtained by the authentication interface from the common credential store and the common credential store is configured to maintain authentication data accessible by a plurality of applications of the client.

5. The method as recited in claim 4, wherein the authentication interface is configured with one or more components to:
    provide interactions between a browser application and the common credential store; and
    provide interactions between one or more smart client applications and the common credential store.

6. The method as recited in claim 5, wherein the interactions are limited based upon a list specifying which applications and domains are permitted to interact with the common credential store.

7. The method as recited in claim 5, wherein the interactions provided include one or more of:
    adding data to the store;
    removing data from the store;
    determining the currently authenticated user of a client application;
    managing a user account profile;
    retrieving authentication data associated with an authenticated user account; and
    retrieving user customized data for one or more user accounts for inclusion in a user interface.

8. The method as recited in claim 1, wherein at least one of the applications is a smart client application configured to provide functionality selected from the group consisting of:
    email;
    instant messaging;
    office productivity;
    multimedia management;
    content authoring; and
    software development.

9. The method as recited in claim 1, wherein utilizing the authenticated data includes providing the data via a network to an authentication service to authenticate the user account with respect to the second application.

10. One or more computer readable memory devices storing computer executable instructions that, when executed, direct a client to perform operations comprising:
    receiving a selection from a user of a first application, the selection indicating an interest of the user to access a second application;
    in response to the received selection, determining that a first user account associated with the first application differs from a second user account associated with the second application, wherein the first user account and the second user account correspond to the same user;
    obtaining authentication data associated with the first user account from a common credential store;
    providing access to the common credential store by the client such that an application accessible by the client forms a user interface having representative portions for each of one or more user accounts;
    transferring the first user account to the second application based at least in part on the authentication data and the determination that the first user account differs from the second user account; and
    in response to the transfer of the first user account to the second application, accessing the second application, wherein the second application operates in association with the first user account.

11. One or more computer readable memory devices as recited in claim 10, wherein the transferring comprises:
providing the authentication data to the second application executing on the client, such that the first user account is authenticated with respect to the second application.

12. One or more computer readable memory devices as recited in claim 10, wherein the transferring comprises:
providing the authentication data to an authentication service via a network client to authenticate the first user account with respect to the second application.

13. One or more computer readable memory devices as recited in claim 10, wherein the authentication data includes an authentication token issued over a network to the client by an authentication service upon successful authentication of the first user account with respect to the first application; and
the operations further comprise authenticating the first user account with respect to the second application via the authentication token.

14. A method, comprising:
storing user account data corresponding to a plurality of user accounts associated with a client in a common credential store, wherein the user account data for at least one user account includes one or more customized user elements which are included in a corresponding displayed portion for a respective user account;
providing access to the common credential store by the client such that a plurality of applications accessible by the client are able to form a user interface from the user account data having representative portions for each of the plurality of accounts;
transferring a currently authenticated user account associated with a first application of the plurality of applications to a second application when a user account associated with the second application differs from the currently authenticated user account associated with the first application; and
in response to the transferring, replacing the user account associated with the second application with the currently authenticated user account associated with the first application based at least in part on the transferring.

15. The method as recited in claim 14, wherein one or more of the displayed portions is selectable to cause authentication to the corresponding user account.

16. The method as recited in claim 14, wherein at least one portion displayed in the user interface corresponds to an account which is not currently authenticated on the client.

17. The method as recited in claim 14, wherein:
the customized user elements are selected from the group consisting of: a user tile, a user name, an alias, graphics, audio, animation, video, text selection, color selection, font, a color scheme, and an image.

18. The method as recited in claim 14, wherein the user account data includes a listing of a plurality of user accounts used by the client which is configured to be deciphered by a client application when forming the user interface to determine:
a set of user accounts to represent in the user interface; and
an order in which the corresponding portions are displayed.

19. The method as recited in claim 1, further comprising, in response to the transferring, switching control from the first application to the second application.

20. The method as recited in claim 1, wherein the common credential store stores data describing which applications and user accounts have been used, a frequency of use of the applications and user accounts, and an identification of where data associated with the user accounts originated.

* * * * *